S. KERN.
Thrashing Machine.
No. 729. Patented May 8, 1838.
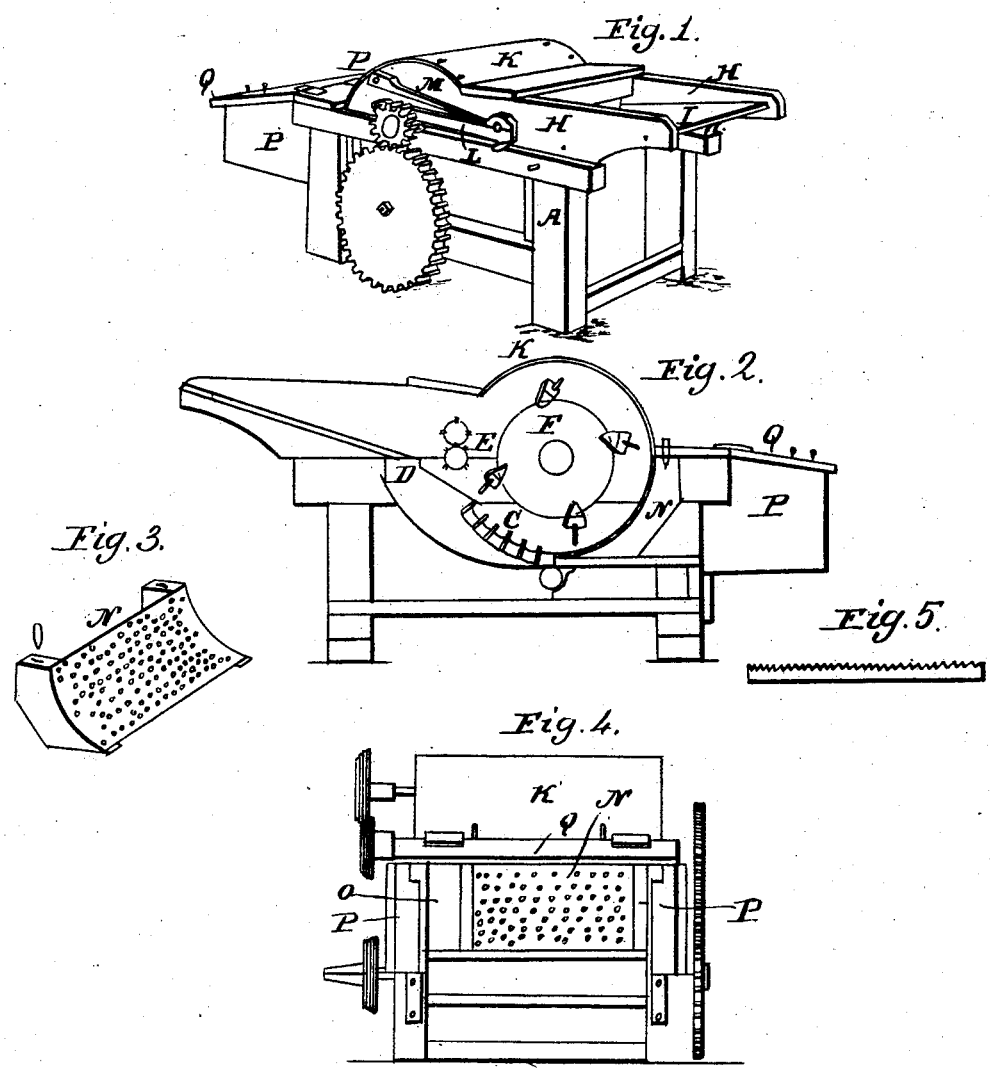

UNITED STATES PATENT OFFICE.

SAMUEL KERN, OF NEAR STRASBURG, VIRGINIA.

THRESHING-MACHINE FOR CLOVER, &c.

Specification of Letters Patent No. 729, dated May 8, 1838.

*To all whom it may concern:*

Be it known that I, SAMUEL KERN, of near Strasburg, Shenandoah county, State of Virginia, have invented a new and useful Improvement in Threshing-Machines for Clover, &c., which is described as follows, reference being had to the annexed drawings of the same, making part of this specification.

This threshing machine consists of a suitable frame A Figure 1 containing a concave and cylinder revolving within the same;—an inclined feeding trough or hopper with one of the feeding rollers and cap or cover over the cylinder;—a perforated segment sheet iron concave placed in front of the cylinder; another feeding roller;—three hinged guards or shutters at the rear end of the frame for giving a proper direction to the straw, grain &c.; pulleys and cog wheels on the ends of the axles for turning the cylinder and feeding rollers.

The concave C Fig. 2 is composed of parallel fluted bars and notched plates of iron—the latter being placed between the bars—and said concave embracing about one fifth the circumference of the cylinder, and each bar is fluted on the side toward the cylinder to allow the teeth in the beaters to have their full effect upon the straw in passing through the machine. The circle of the concave is not exactly concentric with that of the cylinder—being farther from the cylinder at the top that at the bottom.

The concave extends up nearly to the top of the frame and then slopes upward at an angle of about forty five degrees until it strikes the top cross piece D, of the frame. Over this inclined part of the hopper is placed the lower feeding roller E whose gudgeons turn in the top pieces of the frame. By thus shaping the upper part of the hopper and arranging the lower feeding roller the feed of the machine is rendered more easy and a space allowed for the heads of grain to hang in while undergoing the whipping or threshing operation of the swinging beaters as the cylinder revolves.

The cylinder F consists of two or more circular heads fixed on an horizontal axle in which are secured parallel rods to which are hung by links swinging beaters into which are inserted pins or spikes for threshing out the grain. The beaters, however, may be fixed upon the peripheries of the heads. The axle turns in boxes on the sides of the frame in the usual manner, having on one end a cog-wheel and on the other a pulley. The cog wheel works into a cog-wheel on the end of the driving shaft lying across the frame under the concave and communicates by a coupling box and line shaft with the horse power. The pulley receives a band passing around a pulley on the end of the upper feeding roller for turning the same.

The inclined feeding trough or hopper H consists of two parallel sides properly shaped between which is placed an inclined board I beveled on its lower edge where it rests upon the cross piece of the frame and a curved sheet iron cap or cover K nailed to said side pieces, which covers the cylinder as well as the hopper—having at each side a bar L moving on a pin in which bars the gudgeons of the upper feeding roller turn—said bars with the roller being pressed down upon the grain by springs M—slots being left in the side pieces for the gudgeons to play in.

The perforated sheet iron segment concave N Figs. 2, 3, and 4 is narrower than the width of the frame inside and is nailed to two pieces of board made straight on the bottom, vertical or sloped on the back, and cut out where the sheet iron is nailed in the form of the required concave. It is placed opposite the before described concave on the other side of the cylinder in such a manner as to have a space O Fig. 4 between the end of said concave and the inside of the frame of sufficient size to allow of a free passage for the discharge of the clover seed and chaff—said last described concave being used when clover seed is to be got out and not when the machine is used for threshing wheat and other grain—the perforations in said concave giving draft to the machine and forming a rough surface for rubbing out the clover seed from the hulls which are detained in the machine by said concave a sufficient time for said purpose. N in Figs. 3 and 4 represents said additional concave in its proper place. The sides of this concave are secured to the frame by pins or other suitable means.

At the rear end of the frame are two shutters or doors P, P, Figs. 1 and 4 turning horizontally on hinges and another shutter Q turning vertically on hinges which joins these and are united together by pins passing through one into the other so as to fix the two horizontally moving shutters at any angle required according to the direction it is desired that the straw and grain should be discharged—these shutters being for the purpose of preventing the same flying to the right or left and the top shutter preventing the tendency of the same flying upward. These shutters will not only deliver the grain and straw at any convenient point desired but they will prevent many accidents arising from the flying off of broken or loose teeth or spikes, stones and other heavy hard substances which are liable to strike persons standing in the direction of their movement. This part of the machine is considered by the inventor of as much importance in the threshing of grain as the additional concave is in the hulling of clover seed.

In order to separate clover seed from hulls the additional concave must be secured in its proper place and the heads put into the inclined hopper from whence they descend between the two concaves and cylinder in which the rubbing and separation of the seed from the hulls is effected—the additional concave arresting the clover heads until this operation is effectually performed, when the whole is gradually discharged through the opening at the side as fast as fresh heads are introduced. This machine, by the addition of this sheet iron concave, is found to answer as good a purpose in hulling clover seed as it does in threshing grain when said concave is not used.

The invention claimed and desired to be secured by Letters Patent, consists in—

The arrangement of the sheet iron concave N for adapting the machine to the purpose of hulling clover seed as before described.

SAMUEL KERN.

Witnesses:
WM. P. ELLIOT,
EDMUND MAHER.